United States Patent [19]

Schauffele

[11] 4,334,847
[45] Jun. 15, 1982

[54] INJECTION MOLDING DEVICE FOR MOLDING BODIES OF NATURAL OR SYNTHETIC RUBBER

[75] Inventor: Gunther Schauffele, Walheim, Fed. Rep. of Germany

[73] Assignee: Werner & Pfleiderer, Stuttgart, Fed. Rep. of Germany

[21] Appl. No.: 137,584

[22] Filed: Apr. 7, 1980

Related U.S. Application Data

[63] Continuation-in-part of Ser. No. 53,548, Jun. 28, 1979, abandoned, which is a continuation of Ser. No. 737,843, Nov. 1, 1976, abandoned.

[30] Foreign Application Priority Data

Nov. 6, 1975 [DE] Fed. Rep. of Germany ....... 2549813

[51] Int. Cl.³ ............................ B29F 1/03; B29F 1/05
[52] U.S. Cl. ...................................... 425/227; 264/39; 425/543; 425/557; 425/560; 425/566
[58] Field of Search ............... 425/159, 543, 544, 557, 425/560, 562, 564, 566, 227; 264/39

[56] References Cited

U.S. PATENT DOCUMENTS

| 2,505,540 | 4/1950 | Goldhard | 425/587 X |
|---|---|---|---|
| 3,247,304 | 4/1966 | Ninneman | 425/558 X |
| 3,461,498 | 8/1969 | Ramaika | 425/563 X |
| 3,709,644 | 1/1973 | Farrell | 425/160 |
| 3,741,704 | 6/1973 | Beasley | 425/563 X |
| 3,847,525 | 11/1974 | Bielfeldt | 425/555 |
| 3,985,486 | 10/1976 | Hendry | 425/564 |
| 3,999,923 | 12/1976 | Schrammel | 425/561 |

FOREIGN PATENT DOCUMENTS

| 1268821 | 5/1968 | Fed. Rep. of Germany . |
| 656120 | 9/1963 | Italy . |
| 1286888 | 8/1972 | United Kingdom . |

*Primary Examiner*—Thomas P. Pavelko
*Attorney, Agent, or Firm*—Hane, Roberts, Spiecens & Cohen

[57] ABSTRACT

An injection molding device for molding shaped bodies of natural or synthetic rubber comprising a heatable mold for shaping and vulcanizing therein the bodies to be molded and an elongated feed duct communicating with the mold via an injection nozzle. Plasticized material is fed into the duct by a plasticizing device and injection is effected by a piston-type injection device, both communicating with the duct. There is provided in the duct a valve which in its closed position blocks ingress of plasticized material into the duct but opens the duct for ingress of the material to be pressed by the injection means into the mold via the nozzle. The valve head is axially displaceable in the duct and mounts a member so dimensioned that in the open position of the valve it fully closes the nozzle opening, thereby pushing any residual plasticized material into the mold and in the closed position is completely withdrawn from the nozzle opening.

6 Claims, 2 Drawing Figures

INJECTION MOLDING DEVICE FOR MOLDING BODIES OF NATURAL OR SYNTHETIC RUBBER

CROSS-RELATED APPLICATION

This application is a continuation-in-part of Ser. No. 53,548 filed June 28, 1979 now abandoned which in turn is a continuation of Ser. No. 737,843 filed Nov. 1, 1976 and now abandoned.

FIELD OF THE INVENTION

The invention relates to an injection molding device for molding and vulcanizing bodies of natural or synthetic rubber in a heatable pressure mold.

BACKGROUND

There are known injection molding devices of the general type above-referred to which comprise a heatable pressure mold and a cylindrically shaped housing in which a screw extruder rotates to plasticize preliminarily plasticized material. The plasticized material is fed to a distributor duct which together with a cylinder-piston system constitutes an injection unit. This injection unit communicates with the pressure mold via a nozzle and is operated by means of a cylinder-piston servo system and a valve head which constitute a ventil device that is alternately connected to the plasticizing means or the injection unit.

In the manufacture of rubber articles, a temperature gradient occurs unavoidably between the heated pressure mold and the piston-operated injection means. The presence of such a sharp temperature gradient causes considerable manufacturing difficulties.

The vulcanization of the injected material occurs in the pressure mold and such vulcanization requires a much higher temperature than is needed during the plasticizing and the injection operation proper. The result is that there is a considerable conduction of heat from the mold to the injection nozzle and thus to residual plasticized material still present in the injection nozzle. As a result of the heat conduction, a temperature exists within the range of the injection nozzle such that material remaining in the injection nozzle is partly vulcanized and such partly vulcanized material will be forced into the mold during the next following injection cycle.

The presence of partly vulcanized material and of fresh plasticized material which is forced into the mold during the next following injection operation may cause flaws in the bodies to be formed in the mold, and, thus, a general decline in the quality of the obtained products.

The same disadvantageous results occur when the molded bodies consisting of heat-setting reaction masses—for instance—Duroplasten—are produced.

During the setting of such material in the pressure mold, a setting of residual material to be injected occurs in the injection nozzle and such residual material is forced during a subsequent injection cycle into the mold together with fresh material and this also results in flaws in the molded bodies.

It is known for instance, from DT-AS No. 1,197,610 (published German Patent application) to provide injection molding devices in which it is attempted to limit the damaging temperature levels of reaction masses so that the material to be pressed is exposed to the injection temperature only for a very short period of time or is held at the reaction temperature. Moreover, the injection device proper is so built that it can be very easily disassembled into the components to be cleaned. Such disassembly and subsequent cleaning, however, easy, still entails stopping of the entire installation for a certain length of time.

The duration of the effect of heat at the reaction temperature is also essentially influenced by the shape and size of the molded body to be produced. Hence, the arrangement as disclosed in the German publication can be used only under limited conditions and, in particular, a reaction of the reaction mass at the nozzle can not be prevented.

Moreover, in the known valve device after opening and closing of the distributor channel communicating with the injection nozzle, a residue of the material remains after each injection operation and such residue is likely to set.

THE INVENTION

It is a broad object of the invention to provide a novel and improved injection molding device of the general type above-referred to in which the injection operation in the pressure mold is so arranged that ingress of residues of injection material from a preceding injection operation into the mold is prevented by automatically and completely removing all residues in the nozzle opening, thereby obtaining a molded body free of flaws as may be caused by partly vulcanized residual material.

SUMMARY OF THE INVENTION

The above-referred to object, as well as further objects, features and advantages to be evident hereinafter are obtained by providing as a distributing means a distributor duct which is in communication with a plasticizing means. This communication can be opened or closed by a valve which comprises a valve seat, preferably a conical valve seat located within the distributing duct and a valve head which is axially displaceable into and out of the valve closing position and which mounts a nozzle clearing member. This member is fully pushed into the nozzle opening when and while the valve is open and is completely withdrawn from the nozzle opening when the valve is closed. The displacement of the valve head and, thus, of the nozzle cleaning member, is preferably effected by a Servo-system of the cylinder-piston type.

As a result, the injection nozzle which is unavoidably very close to the hot pressure mold is fully cleaned of residues of residual material during each injection cycle. Accordingly, the disadvantageous effect of partly reacted or partly vulcanized residual material when mixed with fresh material is effectively prevented.

A further advantage is that the arrangement of the distributing means, according to the invention, reduces the required cycling time as even when the pressure mold is still open a metered quantity of plasticized material can be fed to the injection means into the distributor duct. Of course, full loading of the pressure mold occurs only by activation of the piston of the injection means. The volume of the metering space in the cylinder of the injection means can be readily and accurately selected in accordance with the cavity within the mold thereby avoiding an overloading of the mold.

The use of an injection means including a piston for pushing out the material makes it possible to apply a final pressure upon the material to be injected into the pressure mold via the duct and the nozzle, thereby further improving the plurality of the produced molded bodies.

BRIEF DESCRIPTION OF THE DRAWING FIGURES

In the accompanying drawings, an embodiment of an injection molding device for molding bodies of natural or synthetic rubber in continuous operation according to the invention is shown by way of illustration and not by way of limitation.

In the drawing:

FIG. 1 is an elevational view partly in section of the injection molding device; and FIG. 2 is an elevational view, partly in section, of the valve means and other operational means of the device in greater detail and on an enlarged scale.

DETAILED DESCRIPTION OF THE DRAWING

Figure 1:
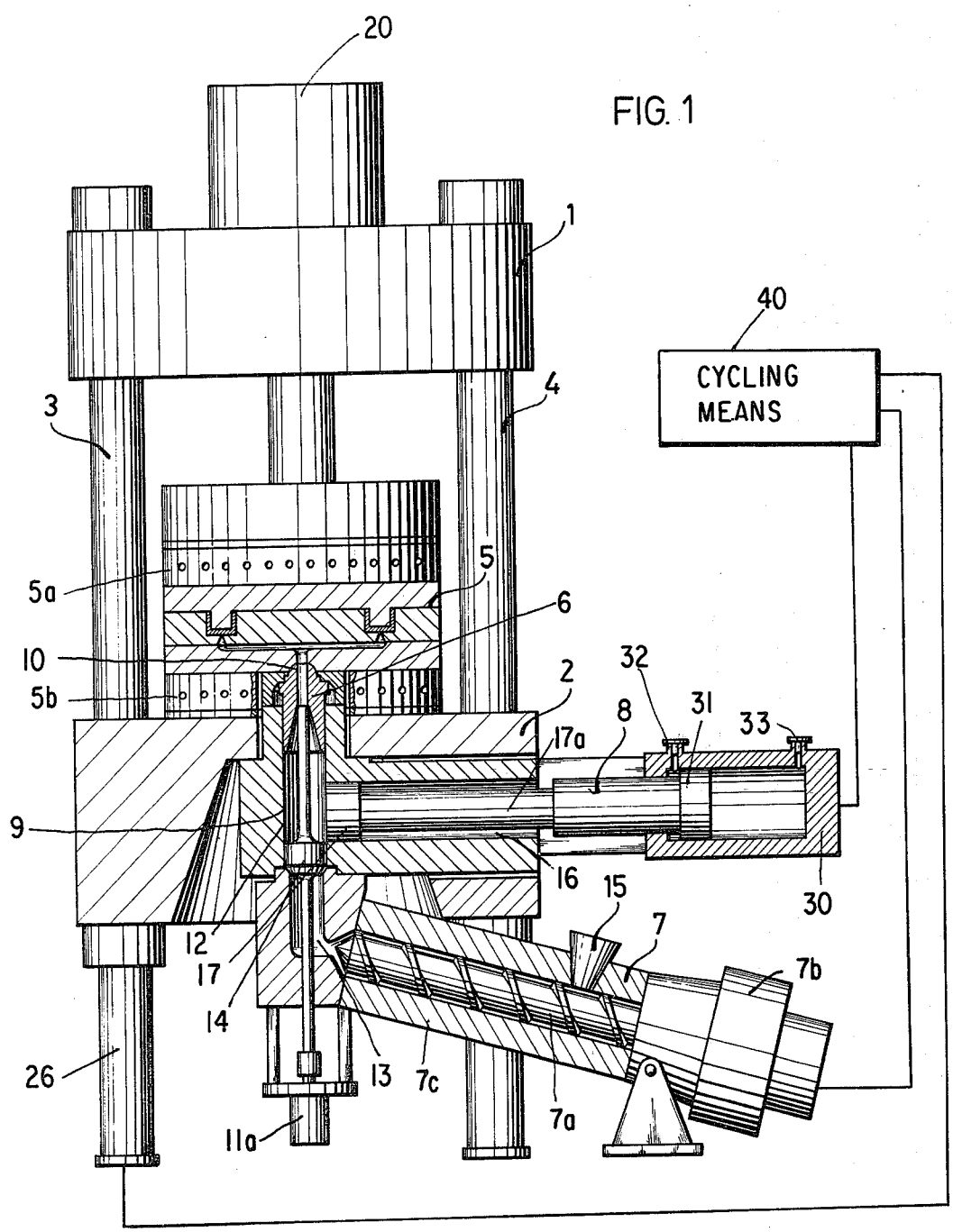

Referring now to the drawing, the injection molding device comprises a vertical column press including a movable cross head 1 and a stationary lower cross head 2. As is shown in FIG. 1, the upper cross head is supported by uprights 3 and 4 and supports a device 20 of generally conventional design for opening and closing a mold 5. The uprights 3 and 4 and all other components of the device are mounted on a foundation 26.

The mold 5 as shown is a pressure mold consisting of movable mold half 5a and stationary mold half 5b, each of which is heatable in a conventional manner as schematically indicated. The mold half 5a is supported by the movable upper cross head 1 and the mold half 5b is supported on the stationary lower cross head. This press is particularly suitable for the production of different molded rubber bodies since the horizontal cross heads are particularly suited for rapid replacement of the mold. Thus, for instance, two molds can be used side by side in this press, i.e. one mold is in the press during the injection process while the finished rubber molded product is removed from the other adjacent mold outside the press. In the known presses, it is difficult to integrate short, readily accessible injection channels which are necessary in order to meet the required standard of quality of rubber molded products.

The molding material, such as natural or synthetic rubber to be fed into the mold, is plasticized and conveyed by a plasticizing means generally designated 7. The plasticizing means is schematically shown as comprising a cylindrical casing 7c in which rotates a screw 7a driven in a conventional manner by suitable drive means 7b. The casing 7c is supported for pivotal movement about pin 7d and the casing is movable between the operative position as shown in FIG. 1 and an inoperative position as will be explained in greater detail later. In the operative position, the casing 7c is inclined upwardly and the plasticized material is driven upwardly towards a distributor duct 9. In the inoperative position, the casing 7c is pivoted to a position in which the duct 9 is accessible for cleaning purposes as will be explained more fully later. The pivotal mounting of casing 7c permits exact alignment of the injector means and the distributor duct. A hopper 15 is provided to feed material to be plasticized into the casing 7c.

Further provided is an injection means 8 comprising a housing 2a arranged in the head 2 and provided with a cylindrical chamber 16 in which a piston 17 is axially displaceable by a piston rod 17a which can be reciprocated by a servo system of conventional design. There is shown a cylinder 30 in which a piston 31 is axially displaceable. Ports 32 and 33 are provided to apply pressure to either side of piston 31 to displace the piston in either direction and thus the piston 17 in the casing 16 of the injection means.

The plasticizing means 7 is located below the injector means 8 in substantially the same plane to minimize heat losses.

Other types of operating means for the plasticizing means 7 and the injection means 8 may, of course, be provided.

A feature of the invention is that the injection means 8 and the means for distributing the material inclusive of duct 9 are both mounted in the lower cross head 2 while the plasticizing means 7 abuts thereagainst in the operative position which renders the construction compact and affords further advantages which will be evident later.

Figure 2:
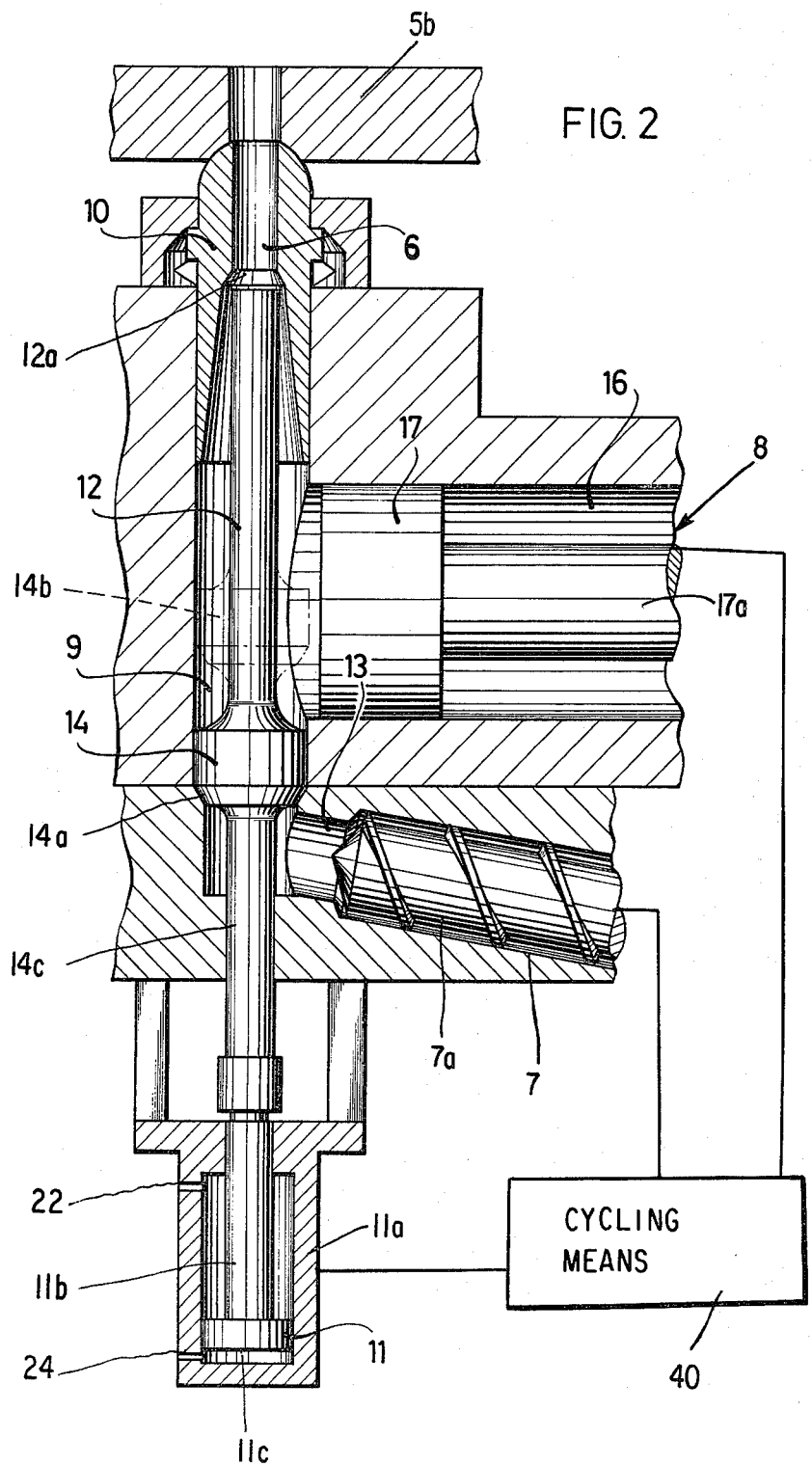

Referring now to FIG. 2, therein is shown the distributor duct 9 with which the plasticizing means 7 and the injection means 8 communicate. At the end of duct 9 there is provided a removable nozzle 10 of conventional design including an injection opening 6 which serves to inject plasticized material into the mold. The nozzle 10 is removably secured in the housing 2a by a retainer 10a which is detachably connected to the housing by bolts or other suitable fasteners. The plasticizing casing 7c abuts against a connecting head 2b which is detachably connected to housing 2a by bolts 7e.

The duct 9 has provided therein a valve means 14 which is disposed intermediate the plasticizing means 7 and the injection means 8, for reasons which will be more fully described hereinafter. The valve means 14 comprises a valve head 14b which seats on a preferably conical shaped seat 14a formed on connecting head 2b. The valve head mounts on its side facing nozzle 10 a rod 12 and the upper end portion 12a of which is so shaped that it fits the width and length of the nozzle opening 6. Opening and closing of valve head 14b is controlled by means of a rod 14c, the axial position of which and thus the opening of closing position of the valve head, are controlled by a servo system 11 of conventional design. The servo system comprises a cylinder 11a slidably supporting a piston rod 11b which is detachably coupled to rod 14c by a releasable coupling 11d. The rod 11b is displaceable by applying pressure to one or the other side of a piston 11c on rod 11b by means of ports 22 and 24. The means for generating such alternating pressure conditions are conventional and hence are not shown in detail.

To clean the valve 10 or duct 9 as to replace worn parts, the lower mold half 5b is removed from head 2 and the retainer 10a is removed from housing 2a so that the nozzle 10 can be removed from the housing 2a. Subsequent thereto, the coupling 11d is released and the valve means 14 together with its valve rod 12 and 14c can be pulled out of the distributor duct 9.

Bolts 7e are then removed and the connecting head 2b together with the plasticizing means 7 can be pivoted downwardly so that the distributor duct 9 is accessible from both sides. Since the plasticizing means 7 is only pivoted about the mounting point at pin 7d and is not shifted relative thereto, it does not require to be readjusted each time the plasticizing means has been lowered.

The construction including the releasable nozzle 10 and the releasable plasticizing means 7 permits rapid access to the duct 9.

The entire feed means formed of the plasticizing means 7, the injection means 8 and the rod 12 with the closing valve means 14 are arranged close together requiring a minmum amount of space so that flow paths of favorable flow characteristics, necessary for the rubber injection molding compositions, are produced. The mounting of the entire feed means in the lower head 2 has the substantial advantage that, in addition to a compact construction, the heat losses can also be kept low.

For this reason, the construction is characterized by the following various features:

the rod 12 passes through the entire nozzle opening 6 and cleans it;

the plasticizing means 7, injection means 8 and rod 12 including the closure valve means 14 are located within the region of the lower head 2;

the plasticizing means 7 is arranged directly below the injection means 8 and at an upwardly inclined angle with respect thereto;

the distributor duct 9 is readily accessible for cleaning from two sides, namely via the removable nozzle 10 of the injection channel and via the plasticizing means 7 which is pivotably movable away from the lower head 2.

The lower cross head 2 forms a press table which receives the distributor duct 9 and the injection means 8 while the plasticizing means 7 abuts against the head 2 via removable connecting head 2b.

OPERATION OF THE INJECTION MOLDING DEVICE

Assuming that the valve head 14b is in the open position, as is indicated by the dotted lines and that the plasticizing means 7 is operated, plasticizing material is fed through inlet 13 into duct 9 and thus also into the metering cylinder 16 of injection means 8. The nozzle opening 6 is closed at this stage of the operation as the end portion 12a of rod 12 is fully pushed into the nozzle opening. Accordingly, the entire quantity of plasticized material as it is fed into duct 9 is controlled by the injection means 8.

Due to the closing of the nozzle opening, the aforedescribed operational stages can be carried out while the mold 5 is still open thereby correspondingly shortening the total cycling time.

The next operational step is to move valve head 14b into the closed position by means of servo system 11. As a result of such closing, the communication between plasticizing means 7 and duct 9 is also closed and the nozzle opening 6 is free as the end portion 12a of rod 12 is withdrawn simultaneously with the closing of the valve head. Injection of material into the mold is now effected by activating the injection means, and more specifically, piston 17 thereof. After completion of the injection step, valve head 14b is again lifted into its open position by means of servo system 11 thereby pushing rod end 12a into nozzle opening 6 thus forcing any residual material which may be in the nozzle opening into the mold. As previously pointed out, such cleaning of the nozzle opening of any residual material assures that during the subsequent vulcanization of the material now in the mold no flaws in the mold body to be vulcanized can be caused by residual portions of material which were left in the nozzle opening during the preceding vulcanization step, and thus have become partly vulcanized by the head unavoidably radiated from the pressure mold 5 while the same is heated for vulcanization.

Various suitable types of cycling means capable of controlling the aforeindicated operational stages in sequential sequence are well known in the art and readily available in the market. There is schematically indicated cycling means 40 connected to plasticizing means 7, injection means 8 and servo system 11 controlling valve 14. The device is now ready for a new cycle.

While the invention has been described in detail with respect to a certain now preferred example and embodiment of the invention, it will be understood by those skilled in the art, after understanding the invention, that various changes and modifications may be made without departing from the spirit and scope of the invention, and it is intended therefore, to cover all such changes and modifications in the appended claims.

What is claimed is:

1. An injection molding device for producing molded bodies of natural or synthetic rubber type plasticized material, said device comprising a vertical press including in combination:

a stationary lower cross head, a movable upper cross head, uprights supporting the upper cross head for movement with respect to the lower cross head, a heatable pressure mold including upper and lower mold halves respectively supported by the cross heads for being opened and closed upon movement of the upper cross head;

a feed duct mounted in said lower cross head for feeding the material to said mold;

plasticizing feed means engaged with said lower cross head and directly communicatng with one end of said duct for feeding plasticized material into said duct;

a removable nozzle in the other end of said duct communicating directly with said mold for feeding material from said duct into said mold, said nozzle comprising a body having a nozzle opening of determined length and width and a conically flared passageway joined to said nozzle opening and extending therefrom towards said feed duct;

injection means supported by and within said lower cross head in superposed relation above said plasticizing feed means for injecting plasticized material in said duct into said mold via said nozzle, said injection means including a casing mounted in said lower cross head directly communicating with said duct at a point intermediate said nozzle and said plasticizing feed means;

valve means for controlling the feeding of plasticized material from said plasticizing means into said duct and said injection means, said valve means including a valve head and a valve seat provided in the duct intermediate the connections with said plasticizing feed means and said injection means, said valve head being reciprocable so that movement towards said nozzle opens said duct for feeding material by said plasticizing feed means into said duct and movement towards said one end blocks such feed of material, said valve means further including a piston connected to said valve head for reciprocating said valve head;

a nozzle cleaning member fitting the width and length of the nozzle opening;

a coupling rod connecting said cleaning member to said valve head so as to insert said cleaning member into the nozzle opening when the valve head is moved into its open position and to withdraw the cleaning member from the nozzle opening upon closing of said valve head, said nozzle cleaning member being disposed in said flared passageway with its end in proximity to said nozzle opening with the valve head in closed position, said nozzle cleaning member penetrating into said nozzle opening and extending the full length thereof in tight-fitting manner with the valve head in open position to constitute a means for fully cleaning said nozzle opening of residues of plasticized residual material; and control means coacting with said piston for opening and closing said valve head, wherein the length of said rod and the axial movement of the valve head are so correlated that the axial displacement of the valve head upon opening of the valve moves said cleaning member into the nozzle opening and the closing movement of the valve head withdraws the cleaning member therefrom.

2. The injection molding device according to claim 1 wherein said injection means comprises a piston operated pressure means, said plasticizing feed means being below said injection means and upwardly inclined at an angle with respect to said injection means.

3. The injection molding device according to claim 1, wherein the valve seat of said valve means is mounted within said duct intermediate the plasticizing feed means and the injection means.

4. The injection molding device according to claim 1, wherein said plasticizing means is pivotably mounted for movement between an operatively engaged position with said feed duct and an inoperative position, said feed duct being accessible at both ends thereof with said nozzle removed and said plasticizing means in said inoperative position.

5. The injection molding device according to claim 3 comprising a connecting head detachably connected to said casing of said injection means, said plasticizing means abutting against said connecting head in said operative position and being pivotably lowered to said inoperative position with said connecting head after the latter has been detached from said casing.

6. The injection molding device according to claim 5 wherein said valve seat is in said connecting head.

* * * * *